(12) United States Patent
Rode

(10) Patent No.: US 10,208,790 B1
(45) Date of Patent: Feb. 19, 2019

(54) ADJUSTABLE SPACER WITH HARDENED ENDS

(71) Applicant: TEMPER CORPORATION, Fonda, NY (US)

(72) Inventor: John E. Rode, Fonda, NY (US)

(73) Assignee: TEMPER CORPORATION, Fonda, NY (US)

(*) Notice: Subject to any disclaimer, the term of this patent is extended or adjusted under 35 U.S.C. 154(b) by 0 days.

(21) Appl. No.: 15/803,057

(22) Filed: Nov. 3, 2017

(51) Int. Cl.

| F16C 25/06 | (2006.01) |
|---|---|
| F16C 25/08 | (2006.01) |
| F16B 31/04 | (2006.01) |
| F16C 19/36 | (2006.01) |
| C21D 1/42 | (2006.01) |
| C21D 1/10 | (2006.01) |
| B21D 53/12 | (2006.01) |
| C21D 9/00 | (2006.01) |
| G01B 5/14 | (2006.01) |
| C21D 1/63 | (2006.01) |

(52) U.S. Cl.
CPC .......... F16C 25/086 (2013.01); B21D 53/12 (2013.01); C21D 1/10 (2013.01); C21D 1/42 (2013.01); C21D 9/0068 (2013.01); F16B 31/04 (2013.01); F16C 19/364 (2013.01); C21D 1/63 (2013.01); F05D 2300/171 (2013.01); F16C 2229/00 (2013.01); G01B 5/146 (2013.01)

(58) Field of Classification Search
CPC ... C21D 1/06; C21D 1/08; C21D 1/09; C21D 1/10; C21D 1/18; C21D 1/63; F16C 19/548; F16C 26/06; F16C 26/083; F16C 2229/00; G01B 5/46
See application file for complete search history.

(56) References Cited

U.S. PATENT DOCUMENTS

| 5,386,630 A * | 2/1995 | Fox ................. B23P 19/04 29/407.08 |
|---|---|---|
| 5,402,560 A | 4/1995 | Rode |
| 5,535,517 A | 7/1996 | Rode |
| 5,549,397 A * | 8/1996 | Rode ............... F16C 19/548 384/551 |
| 5,785,434 A | 7/1998 | Rode |
| 6,283,639 B1 | 9/2001 | Rode |
| 6,327,773 B1 | 12/2001 | Rode |
| 6,418,613 B1 | 7/2002 | Rode |
| 6,487,775 B2 | 12/2002 | Rode |
| 6,662,449 B2 | 12/2003 | Rode |
| 6,684,506 B2 | 2/2004 | Rode |

(Continued)

FOREIGN PATENT DOCUMENTS

| DE | 2364275 A1 * | 7/1975 | ........... B60B 27/00 |
|---|---|---|---|
| JP | 07317883 A * | 12/1995 | ........... F16C 25/083 |

*Primary Examiner* — Phillip A Johnson
(74) *Attorney, Agent, or Firm* — Heslin Rothenberg Farley & Mesiti P.C.

(57) ABSTRACT

An adjustable spacer with hardened end portions and a non-hardened intermediate portion therebetween is mountable between a pair of roller bearings also mounted on a shaft such an axle or spindle or the like. The hardened material contacts the faces of the roller bearings but helps prevent wear therebetween and unwanted movement of the bearings on the shaft. The unhardened material allows the spacer to collapse in the axial direction to maintain desired axial loads on the bearings.

20 Claims, 14 Drawing Sheets

(56) References Cited

U.S. PATENT DOCUMENTS

| | | | |
|---|---|---|---|
| 6,935,788 B2* | 8/2005 | Stanczak | F16C 19/548 |
| | | | 384/551 |
| 7,251,892 B2 | 8/2007 | Strait | |
| 7,346,985 B1 | 3/2008 | Strait | |
| 8,893,364 B2 | 11/2014 | Rode | |
| 9,045,807 B1 | 6/2015 | Rode et al. | |
| 2005/0005451 A1* | 1/2005 | Strait | F16C 19/548 |
| | | | 29/898.09 |
| 2005/0269147 A1* | 12/2005 | Mito | B60K 17/165 |
| | | | 180/248 |
| 2014/0105680 A1* | 4/2014 | Schnebele | F16D 1/04 |
| | | | 403/359.5 |

* cited by examiner

ADJUSTABLE SPACER WITH HARDENED ENDS

TECHNICAL FIELD

This invention relates in general to the field of shaft mounted bearings, and in particular, to an adjustable spacer with hardened end portions useable between a pair of bearings mounted on a shaft including an axle or spindle or the like.

BACKGROUND ART

A typical tapered roller bearing may include a bearing cone having an inner bearing race, a plurality of rollers within a roller cage, and an outer bearing race. Typically, a pair of tapered roller bearings, may be mounted on a wheel axle for rotation of the wheel. In addition, they may be mounted on drive systems used to drive, for example, wheels. However, bearings, particularly those mounted on heavy duty trucks or similar vehicles may be exposed to large forces when mounted in a bearing assembly. The inner bearing race of a bearing used in an assembly is generally designed to remain stationary relative to the shaft upon which it is mounted, such that the outer race rotates relative to the inner race via the rollers therebetween. Sometimes, such mounted bearings may crawl, namely, rotate, or move relative to the axle or spindle, which is undesirable. Movement of the inner race in this situation may lead to excessive and premature wear of the race, shaft and/or bearing assembly in general, as well as the tires. This in turn may lead to, for example, drive or wheel end failure and a catastrophic event.

Sometimes an adjustable spacer in the form of a ring or may be placed between the bearings of a bearing assembly to remove bearing endplay and/or transmit axial loads to the bearings. Such a spacer may contain a compressible area and is mounted between two opposed bearings on a shaft including an axle or spindle to allow a load to be applied on the bearings while maintaining the bearings in a desired axial position. When the bearings are forced towards each other with a predetermined load, the spacer will axially compress. In this manner the forces within a bearing may be controlled. However, when such a spacer is used, any bearing crawl may also result in additional damage or wear on the bearing and/or spacer at their area of contact, for example, between the axially directed face of the bearing and face of the spacer.

In addition to the aforementioned problems, shafts and bearing assemblies may also have a variable diameter. For example, a smaller diameter portion may be located at the end of the shaft with a larger diameter portion located at or near the opposite end. A conical portion of the shaft may function as a transitional area between the large and small diameter portions. A bearing assembly configuration commonly found in such shafts including wheel axle assemblies includes two bearings of different diameters each mounted on the different diameters of the axle.

Therefore, a need exists to inhibit or alleviate crawl of bearings mounted on shafts including an axle or spindle. In addition a need exists for an adjustable spacer which may be used in situations to inhibit or alleviate crawl or other undesirable relative movement between the bearing and the shaft upon which it is mounted. A need also exists for an adjustable spacer which, when in contact with a bearing which may crawl, wears less than an ordinary adjustable spacer, particularly on its face which contacts the bearing. A need also exists for such an adjustable spacer, and/or assembly therefor, which may be used with bearings of different diameters mounted on an axle or spindle having different diameters.

SUMMARY OF THE INVENTION

The aforementioned goals may be achieved using an adjustable spacer constructed in accordance with the principles of the present invention.

An adjustable spacer constructed in accordance with the principles of the present invention includes an annular spacer configured to be mounted on a shaft to apply a force to one or more roller bearings mounted on the shaft. The annular spacer includes a first end portion, a second end portion opposite the first end portion, and an intermediate portion located between the first end portion and the second end portion. The first end portion and second end portion include a hardened material. The intermediate portion comprises a non-hardened material and is more deformable than that first end portion and second end portion.

The first end portion includes a face exposed in an axial direction, which may be initially formed of hardened material or surface hardened. The level of hardness of the end portions may be at HRC 62 or harder. The second end portion also includes a face exposed in an axial direction, which may be initially formed of hardened material or surface hardened. The annular spacer is generally configured to be assembled on a shaft including an axle or spindle between two roller bearings to apply a force axially on the roller bearings. The hardened material, which contacts the face of the roller bearing helps resists wear. Also, the deformability of the intermediate section of the spacer allows the same to be compressed in the axial direction, if needed, to maintain the desired force on the bearing face to also help resist crawl and if crawl does occur to resist wear. The spacer may be a constant force spacer where the intermediate portion is compressible at a constant force over a substantial distance of compressibility.

The annular spacer may be formed from a first starting material and the entire spacer is then surface hardened. The intermediate section can then have its surface hardened material removed by for example, grinding, to expose the non-hardened starting material. Also, the first end portion and second end portion may be hardened from the starting material without hardening the intermediate portion of the starting material and annular spacer. The hardened material may be heat hardened, induction hardened, heat treat nitrided, and/or ferritic nitrocarborized. The intermediate portion may be formed from a material different from said first end portion and second end portion. The material used to form the end portions may be harder than the material used to form the intermediate portion.

The invention also includes an adjustable bearing assembly which may include a shaft having one or more roller bearings mounted thereon, and an annular spacer mounted on the shaft to apply a force to the one or more roller bearings. The annular spacer includes a first end portion, a second opposite end portion, and an intermediate portion therebetween. The first end portion and second end portion of the annular spacer may comprise a hardened material, and the intermediate portion a non-hardened material wherein the intermediate portion is more deformable than the first and second end portions.

The invention also encompasses a method of manufacturing an adjustable spacer comprising forming an annular shaped spacer having a first end portion, a second end portion and an intermediate portion therebetween, and forming the first and second end portion of the annular shaped spacer of a material harder than the intermediate portion wherein the intermediate portion is more deformable than the first end portion.

BRIEF DESCRIPTION OF THE DRAWINGS

The invention may best be understood with reference to the following detailed description and drawings in which.

DETAILED DESCRIPTION

Figure 1:
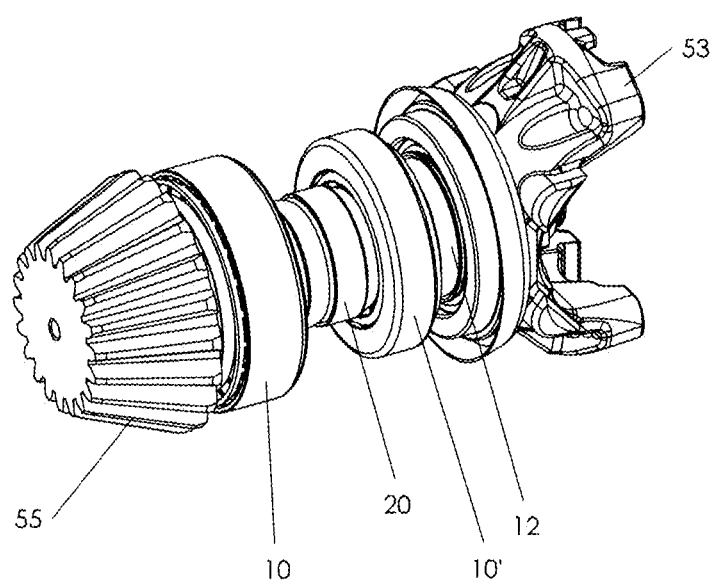
FIG. 1 depicts an isometric view of a bearing assembly within a drive system with a ring shaped adjustable spacer mounted between a pair of roller bearings on a drive shaft.

Referring to FIG. 1, a common truck drive assembly is shown. However, the invention is useable on bearing assemblies mounted on other types of shafts such as wheel axles and spindles. As shown in FIG. 1, the drive system includes a rotating shaft such as a drive shaft 12 and a pair of oppositely opposed bearings 10, 10' mounted thereon. An adjustable spacer 20 constructed in accordance with the principles of the present invention is mounted therebetween. A first end 55 of the shaft includes a gear which drives another gear (not shown) to rotate, for example, a wheel or other shaft. A yoke 53, for example, on the opposite end of the shaft 12 is connected to, for example, another rotating element (not shown) to drive the shaft 12.

Figure 2:
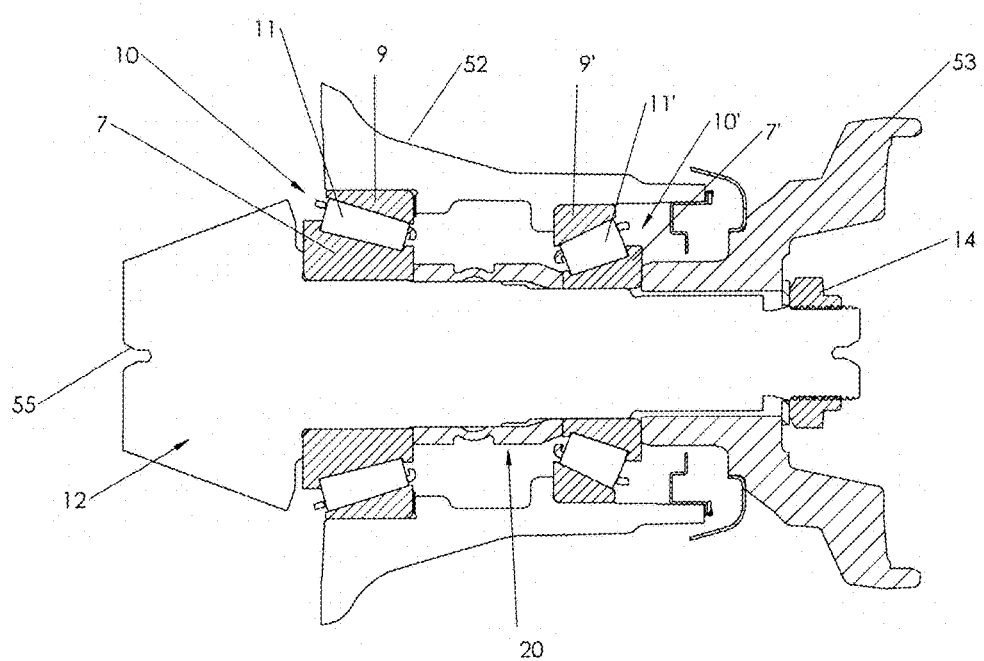
FIG. 2 depicts a sectional view of the drive system of FIG. 1 having a bearing assembly with a pair of conventional tapered roller bearings mounted thereon with an adjustable spacer mounted on the spindle between the bearings.

Referring to FIG. 2, for simplicity a sectional schematic view of the drive system of FIG. 1 is shown. The assembly includes a lock nut 14 used to secure a bearing assembly between a housing 52 (such as a power transmission housing) and a shaft 12. As shown in FIG. 2, the pair of opposed tapered roller bearings 10, 10' are mounted oppositely upon the shaft 12 (or axle). The second bearing 10' may be identical to the first bearing 10 and likewise contains a second inner race 7' along with an outer race 9' with a plurality of rollers 11' mounted therebetween. The second bearing is mounted to the oppositely faced the first bearing 10. Each roller bearing 10, 10' contains an inner race 7, 7' which is mounted directly on the shaft and is therefore in the shape of a ring, along with an outer race 9, 9', also in the shape of a ring, and a plurality of roller bearings 11, 11' in a roller cage mounted therebetween. The outer races 9, 9' rotate about the inner races 7, 7' by roller bearings 11, 11' but are press fit within the housing 52.

In certain applications, it may be desirable to tighten to the nut 14 to a specified torque in order to impart such specified torque, or preload to the bearings 10, 10' and/or bearing assembly. For example, in certain applications, such as tractor or truck drive axles, the lock nut 14 may be specified to be torqued to approximately 500 foot pounds so as to maintain such torque and resulting axial force on the bearings 10, 10', of the bearing assembly along the shaft.

The adjustable spacer 20 is mounted on the shaft 12 of the assembly between the opposed tapered roller bearings 10, 10'. The adjustable spacer 20 is capable of compressing in the axial direction when an axial load, such as that caused by the tightening of nut 14, is applied thereto. Accordingly, referring to FIG. 2, if an axial load is placed on the bearings 10, 10' forcing them towards each other, the adjustable spacer 20 may compress in the axial direction to maintain the desired load against each of the bearings, the desired torque, and/or preload on the bearings.

Referring to FIG. 3, the adjustable spacer 20, used in the assembly of FIG. 2, and constructed in accordance with the principles of the present invention is shown. The adjustable spacer 20 is ring shaped with a first face 24 at a first end portion 28 of the spacer and a second face 30 at a second end portion 32 of the spacer, each located at a particular radius from the axis defining the ring shaped member. An intermediate portion 26 is located between the first end portion 28 and the second end portion 32. The first end portion 28 including the first face 24 and the second end portion 32 including the second face 30 are of a hardened material or metal. A hardened material is generally a material which has been processed to substantially increase its hardness by transforming the metallurgical structure of the material including but not limited to, for example, into a martensite phase or the equivalent thereto. The intermediate portion 26 is not hardened and is deformable so as to compress the spacer 20 in the axial direction. The intermediate portion 26 deforms when a predetermined load is applied to the adjustable spacer in its axial direction. The intermediate portion, first end portion and second end portion should extend throughout the circumference of the adjustable spacer thereby forming a ring shape. The adjustable spacer should be configured to allow for sufficient contact area between the first face 24 and the axially facing surface or flat portion of an abutting inner race 7' of the bearing 10. Also, the adjustable spacer should be configured to allow for sufficient contact area between the second face 30 and the axially facing surface or flat portion of an abutting inner race 7 of the bearing.

The construction of the adjustable spacer may vary. However, it is preferred to have end faces 24, 30 configured to allow the force to be evenly distributed between the faces and the abutting faces of the inner races of the bearings. Substantially flat surfaces for force contact are preferred. Such a configuration enables the even distribution of the load therethrough thereby minimizing areas of uneven stress distribution. However, other surfaces may also be used and the invention is not limited to any particular surface or ring configuration.

The adjustable spacer may compressible and be initially be constructed in accordance with the principles disclosed in U.S. Pat. No. 4,067,585 dated Jan. 10, 1978 and U.S. Pat. No. 4,125,929 dated Nov. 21, 1978 each entitled "Deformable Metallic Elements", invented by the inventor herein and assigned to the assignee of the present invention. Both U.S. Pat. Nos. 4,067,585 and 4,125,929 are hereby incorporated by reference and made a part of the disclosure herein. However, the adjustable spacer may then be hardened so that its end portions including the axially exposed faces are harder than its intermediate portion. Hardening processes are well known to those skilled in the art.

For instance, the adjustable spacer may be made using, for example, AISI 1045 carbon steel where the first end portion and second end portion are induction hardened. Induction hardening is a form of heat treatment in which a metal object is heated by induction heating and then quenched. The quenched metal undergoes a martensitic transformation increasing the hardness and brittleness of the part. The induction hardening may be used to selectively harden areas of a metal part, e.g., its surface, without affecting the properties of the entire part. In accordance with embodiments of the invention, the adjustable spacer may be induction hardened at the end portions including the axially exposed faces thereof without induction hardening the intermediate portion between the end portions. Automated systems for induction hardening parts, such as those disclosed in U.S. Pat. No. 9,045,807, which is incorporated by reference herein in its entirety, are useable to induction harden the end portions of the adjustable spacer. Also, if the entire adjustable spacer is, for example, surface hardened, the intermediate portion between the end portions can be further treated, for example by grinding the surface hardened portions away from the central non hardened material, to reduce the hardness thereof and increase ductileness and deformability.

In some embodiments, the adjustable spacer may be made, for example, using AISI 1026 or 1018 carbon steel where the entire spacer is subjected to a nitride treatment or process to increase the hardness of, for example, the entire part nitriding, also referred to as carbonitriding, is a heat treating process that diffuses nitrogen into the surface of a metal to create a case-hardened surface. These processes are most commonly used on low-carbon, low-alloy steels. They are also used on medium and high-carbon steels, titanium, aluminum and molybdenum. The nitride process effectively converts the steel to an iron active alloy. Nitriding is a metallurgical surface modification technique that is used to increase the surface hardness of a metal, thereby reducing wear. Surface hardness of nitrided parts generally range from 55 to 62 HRC. The intermediate portion of the adjustable spacer can then be treated by grinding away the surface hardened material, or other means, to reduce the portions its hardness and increasing its ductileness and deformability. The grinding helps remove the nitride treated steel.

Ferritic nitrocarburizing may also be used, for example, to harden the entire spacer. Ferritic nitrocarburizing is a type of hardening processes that diffuses nitrogen and carbon into ferrous metals at sub-critical temperatures during, for example, a salt bath. The processing temperature typically ranges from 525° C. (977° F.) to 625° C. (1,157° F.), but usually occurs at 565° C. (1,049° F.). At this temperature steels and other ferrous alloys are still in a ferritic phase, which is advantageous compared to other case hardening processes that occur in the austenitic phase. There are four main classes of ferritic nitrocarburizing include gaseous, salt bath, ion or plasma, and fluidized-bed. After ferritic nitrocarburizing the intermediate portion of the adjustable spacer can then be treated by grinding, or other means, to reduce the effects of the nitride treatment of that portion and reduce its hardness and increase its ductileness and deformability. Other techniques than those described herein, may be used to treat the spacer to increase hardness of the end portions while having a less hardened intermediate portion. Alternatively, as described below, the adjustable spacer may be made using separate hardened end portions, which are assembled together with a non-hardened intermediate section. An intermediate section of less harder and more ductile material may be used and assembled with harder end portions.

The adjustable spacer 20 transmits an axial force to the roller bearings they contact. The hardened end portions 28, 32 and faces 24, 30 of the adjustable spacer, which may directly transfer the forces to the bearings, help minimize or control crawl or undesirable rotational movement of the bearings relative to the shaft. The hardened end portions 28, 32 and faces 24, 30 of the adjustable spacer, which normally have a tendency to wear because of the contact with the bearing faces, will wear less when compared to unhardened end portions and faces. When exposed to axial forces and when in contact with the bearings the hardened material resists wear better than a non-hardened material. In addition, the intermediate portion 26, which is non-hardened and/or more deformable than the end portions 28, 32, allow the spacer to be adjustable so as to maintain the desired endplay, axial force and/or preload on the bearing. In addition, the adjustable spacer 20 should resist rotational torque forces applied by the bearings. For example, when the bearings are subject to rotational forces which may normally cause the bearings to crawl, the adjustable spacer, by transmitting axial faces to the bearings and resisting rotational forces, helps minimize bearing crawl. In addition, the hardened ends 28, 32 and faces 24, 30 help resist wear therebetween.

Figure 3A:
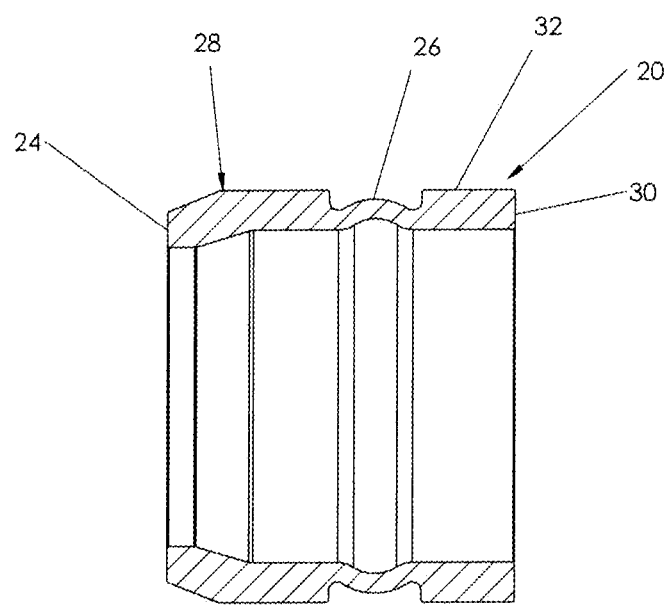
FIGS. 3A and 3B depict a sectional view and an isometric view, respectively of a ring shaped adjustable spacer constructed in accordance with the principles of the present invention.
Figure 3B:
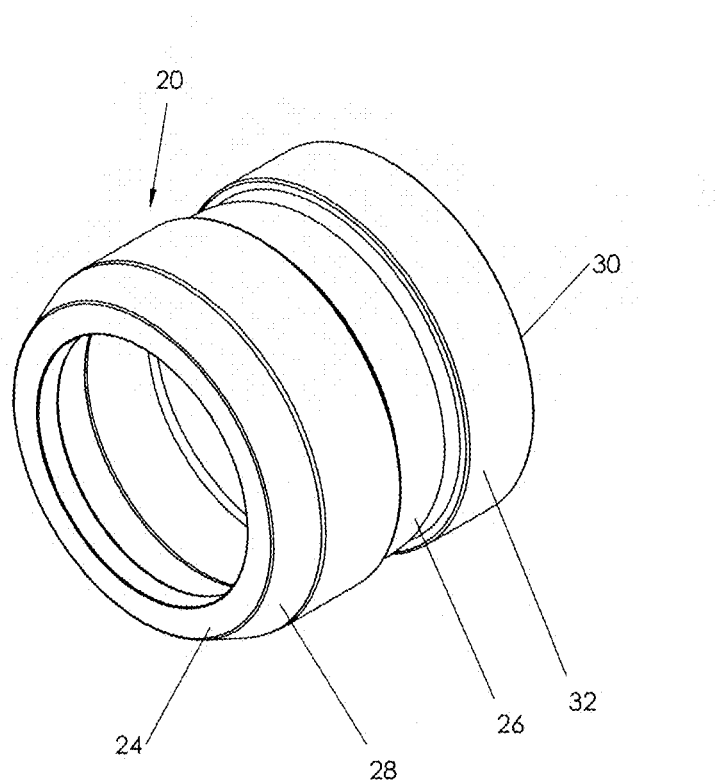
Figure 3C:
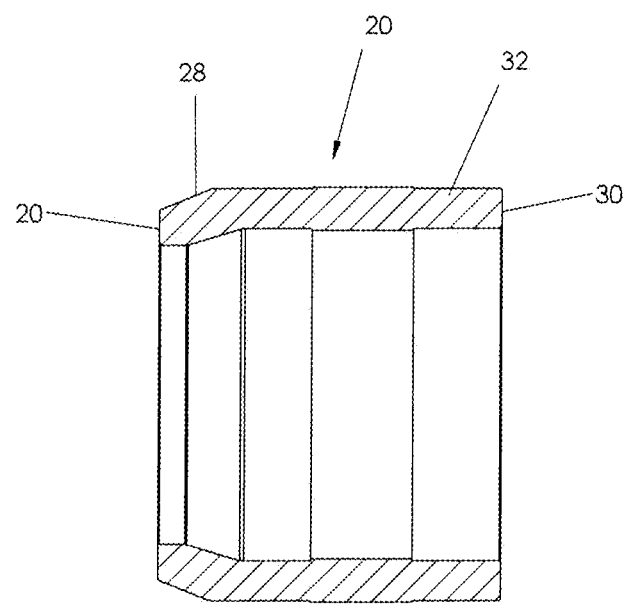
FIG. 3C depicts a sectional view of the adjustable spacer of FIGS. 3A and 3B after surface hardening but prior to machining away hardened portions thereof.

Referring to FIGS. 3A and 3B, one embodiment of an adjustable spacer made in accordance with the principles of the present invention is shown. As previously described, the adjustable spacer includes first end portion 28, a second end portion 32, and an intermediate portion 26 therebetween. The first end portion contains a first face 24 and a second end portion, a second face 30. The first and second face in opposite axial directions. When an axial force is placed on the adjustable spacer 20, the intermediate portion 26 may deform to collapse the axial length of the spacer. The adjustable spacer of, for example, the embodiment shown in FIGS. 3A and 3B may be made using, for example, 304 stainless steel (or a G25 nickel alloy) starting material and as in the shape shown in FIG. 3C. The starting material may then be exposed to a nitride hardening process or a ferritic nitrocarbonizing process as described above. After such hardening, the intermediate portion of the starting material may be ground on the outer surface thereof and the inner surface thereof to form the adjustable spacer shown in FIGS. 3A and 3B. The resultant adjustable spacer will have surface hardened first portion and second portions, with a non-hardened intermediate portion 26 therebetween. The machining of the intermediate section effectively removes the surface hardened materials on the outside and inside diameters of the intermediate section thereby exposing the non-hardened material within the wall of the intermediate portion 26.

Alternatively, the adjustable spacer as shown in FIGS. 3A and 3B may be made by hardening the end portions 28, 32 without hardening the intermediate portion 26. Such versions may be constructed, for example, using 1045 steel. Using 1045 steel, the adjustable spacer may be formed of the configuration as shown in FIGS. 3A and 3B out of non-hardened 1045 steel, and then exposed to a hardening process to harden the first end portion 28 and first face 24 and second end portion 32 and second end face 30. An induction hardening process, as described above, may be used for such hardening. In further alternative embodiments, 1018 or 1026 steel may be used (in the same or similar processes as described above for the use of stainless steel).

Figure 4A:
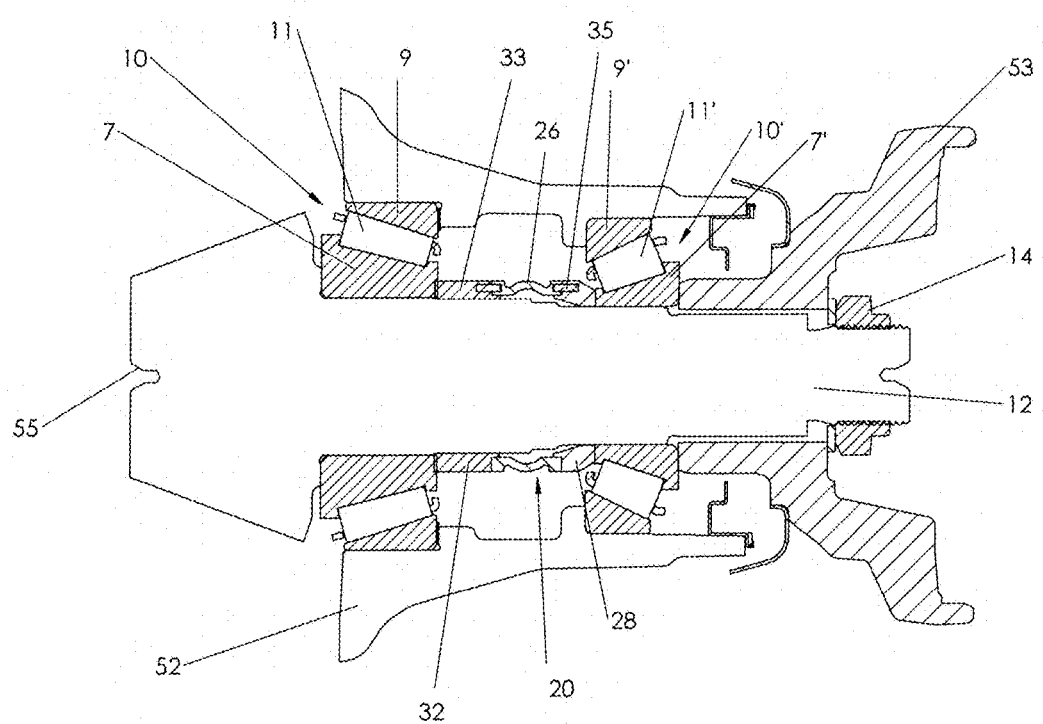
FIG. 4A depicts a sectional view of a drive system similar to the drive system of FIG. 1 containing a pair of conventional tapered roller bearings mounted thereon and another embodiment of an adjustable spacer assembled of multiple materials and mounted therebetween and constructed in accordance with the principles of the present invention.
Figure 4B:
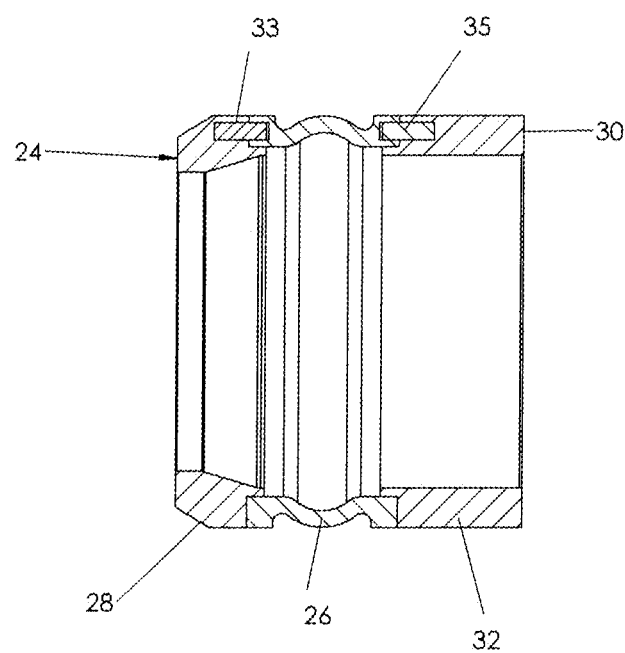
FIGS. 4B and 4C depict a sectional view and an isometric view, respectively of the ring shaped adjustable spacer used in FIG. 4A and constructed in accordance with the principles of the present invention.
Figure 4C:
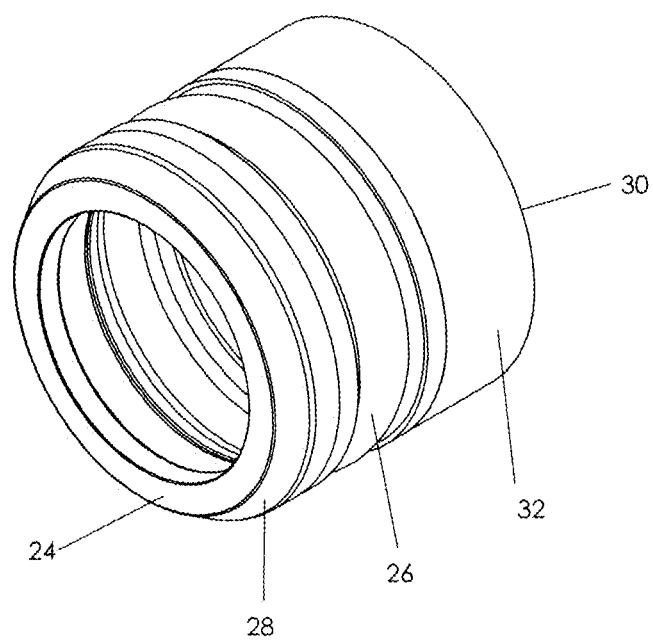

Referring now to FIGS. 4A-4C, an alternative embodiment of adjustable spacer having hardened end portions 28, 32 and end faces 24, 30 and non-hardened intermediate section 26 is shown. In this embodiment, as shown in FIGS. 5B and 5C, a first end portion 28 and second end portion 32, may be made, for example, of non-hardened steel such as 1045 steel and the end portions subject to a hardening process such as induction hardening, as described above. Alternatively, the first end portion 28 and second end portion 32 may initially be made of hardened metal where the entire end portions or surfaces, therefore are hardened. It is preferred that at least the end faces 24 and 30 be hardened so that the end faces, which contact the roller bearings mounted on the axial or spindle resist wear and help prevent bearing crawl. The intermediate portion located between the end portions in this embodiment is preferably formed using a stronger metal alloy such as 304 stainless steel or Inconel 625. Use of such stronger alloys will allow such alloy to deform but only under high specified loads to allow the spacer to adjust in the axial direction. Intermediate portion 26 may be connected to the first end portion 28 and second end portion 32 to resist relative movement therebetween using, for example, the use of pins 33, 35. Such pins 33, 35 may be placed about the circumference of the interface between portions of the ring, for example, every 120 degrees. However, other techniques to connect the intermediate portion to the first end portion and second end portion, such as welding or the use of other types of fasteners may also be used. In the embodiment as shown in FIGS. 4A and 4B, the first end portion and second end portion including the faces thereof, are formed of a hardened material, while the intermediate portion is formed of a non-hardened material which will compress in the axial direction under high force loads. The end portions are coupled to the intermediate portions to prevent relative rotational movement between such portions thereby allowing rotational forces to transfer from one end portion to the other end portion and resist bearing crawl.

Figure 5A:
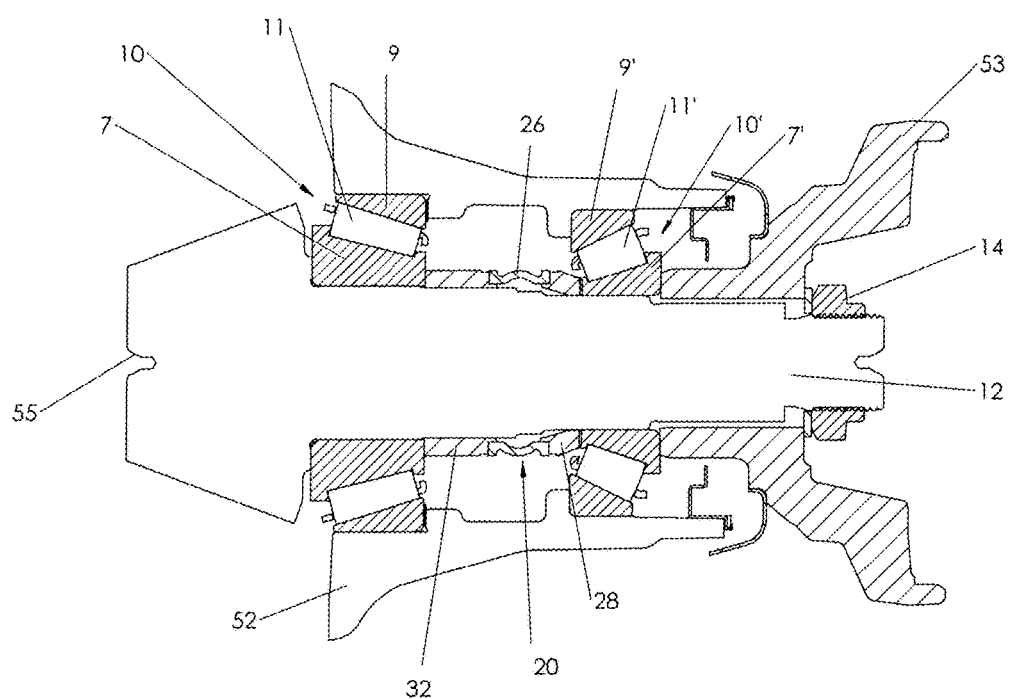
FIG. 5A depicts a sectional view of a drive system similar to the drive system of FIG. 1 having a pair of tapered roller bearings mounted thereon, and an alternative embodiment of an adjustable spacer mounted between each of the bearings on the axial or spindle in accordance with the principles of the present invention.
Figure 5B:
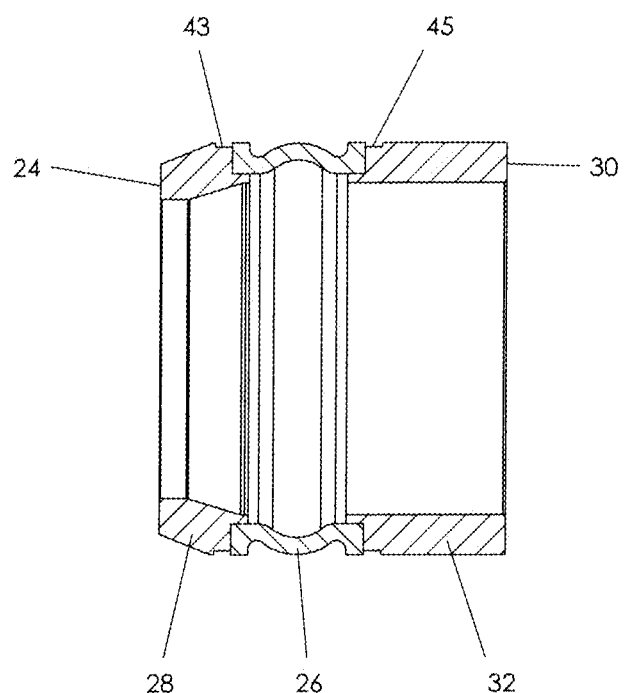
FIGS. 5B and 5C depict a sectional view and an isometric view, respectively of the ring shaped adjustable spacer used in FIG. 5A and constructed in accordance with the principles of the present invention.
Figure 5C:
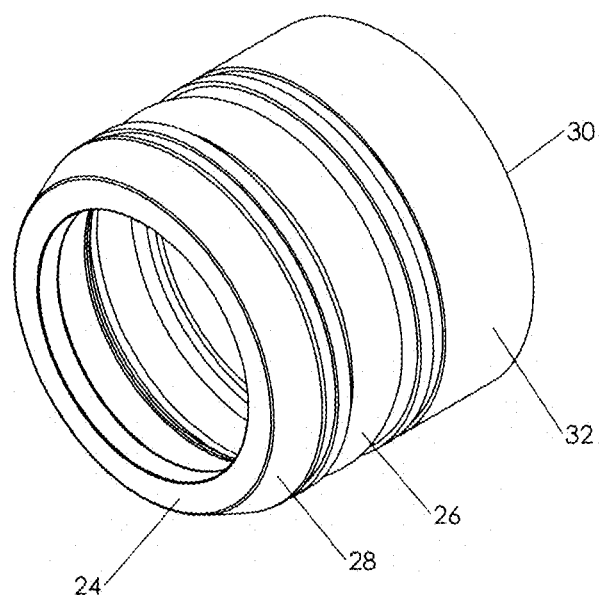

Referring now to FIGS. 5A-5C, an alternative embodiment of the adjustable spacer having hardened end portions 28, 32 and end faces 24, 30 and non-hardened intermediate section 26 is shown. In this embodiment, the construction and assembly of the adjustable spacer is similar to the embodiment shown in FIGS. 4A and 4C, except the intermediate portion 26 is welded about its circumference to the first end portion 28 and second end portion to form welds 43, 45. First end portion 28 and second end portion 32, may, for example, initially be made of non-hardened steel such as 1045 steel. Then, the end portions 28, 32 (prior to assembly of the spacer 20) are subjected to a hardening process such as induction hardening, as described above. The hardened end faces, which contact the roller bearings mounted on the axial or spindle resist wear and help prevent bearing crawl. The intermediate portion 26 located between the end portions 28, 32 in this embodiment may be preferably formed using a stronger but ductile metal alloy such as 304 stainless steel or Inconel 625. Use of such stronger alloys will allow such alloy to deform but only under high specified lows to allow the spacer to adjust in the axial direction. In this embodiment, intermediate portion 26 may be connected to the first end portion 28 and second end portion 32 to resist relative movement therebetween by welds 43, 45, for example. However, other techniques to connect the intermediate portion to the first end portion and second end portion may also be used.

Figure 6A:
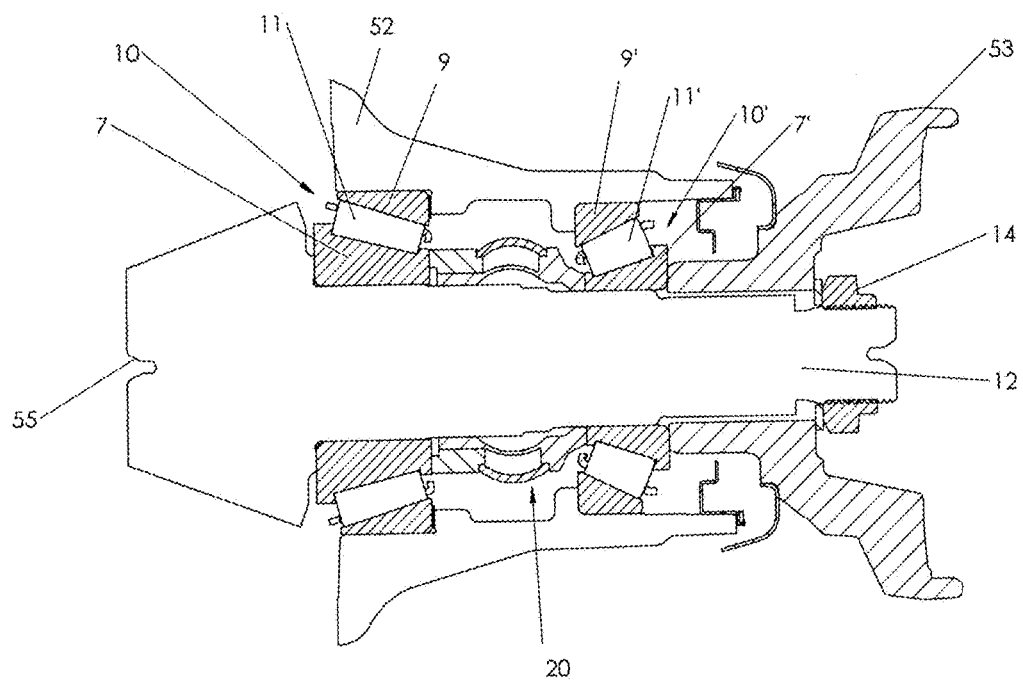
FIG. 6A depicts a sectional view of a drive system similar to the drive system of FIG. 1 having a pair of tapered roller bearings mounted thereon, and another alternative embodiment of an adjustable spacer mounted between each of the bearings on the axial or spindle in accordance with the principles of the present invention.
Figure 6B:
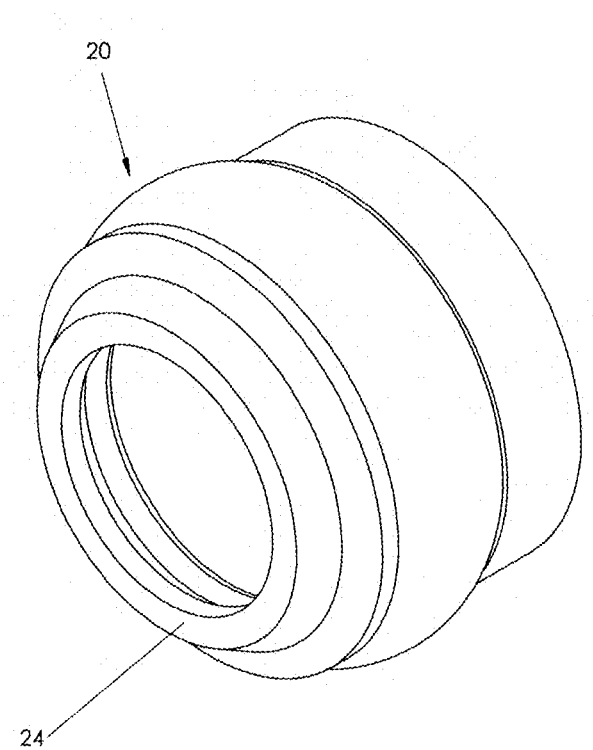
FIGS. 6B and 6C depict a sectional view and an isometric view, respectively of the ring shaped adjustable spacer used in FIG. 6A and constructed in accordance with the principles of the present invention.
Figure 6C:
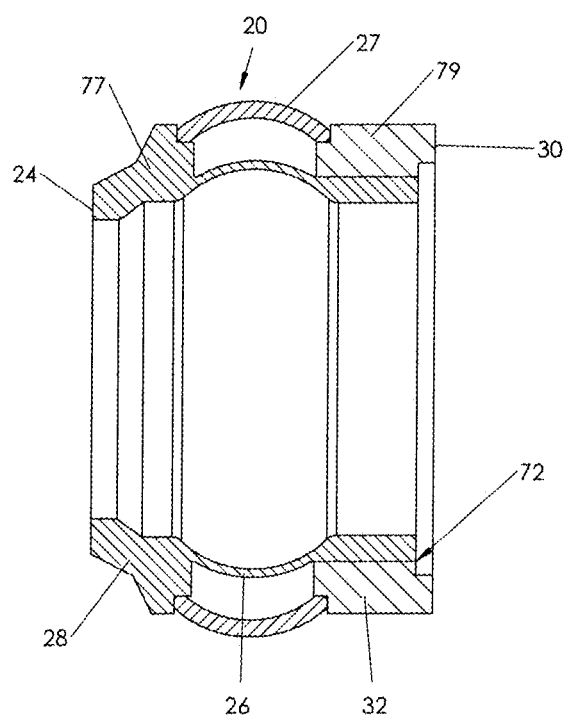

Referring now to FIGS. 6A-6C, an alternative embodiment of the adjustable spacer having hardened end portions and end faces and a non-hardened intermediate section is shown. In this embodiment, the adjustable spacer 20 includes a long section 77 and a short section 79. The long section has an inner diameter which is shorter than the inner diameter of the short section 79 so that the short section fits over one end of the long section 77. Intermediate section 26 is part of the long section 77 and is located between first end portion 28 and second end portion 32. A high load compressible section 27 is also located between first end portion 28 and second end portion 32 and is coupled therebetween. High force section 27 controls the axial load required to compress spacer 20 in the axial direction. Intermediate section 26 may be formed so as to compress at a much lower axial force than high force section 27. Long section 77 and short section 79 may be connected to one another by weld 72 which may be located between such parts but facing the axial direction. Accordingly, any rotational torque imparted on first portion 28 or second portion 32 will be transmitted through weld 72 and intermediate section 26. However, such rotational forces need not be transferred through high load compressible section 27 which need not be rigidly connected to first portion 28 or second portion 32 so as to avoid rotational movement relative to the first end section 28 and second end section 32. High force section 27 may be made, for example, using 304 stainless steel while long section 77 and short section 79 may be made, for example, using 1045 stainless steel. The first end portion 28 and second end portion 32 may be made using 1045 stainless steel and induction hardened (as described previously herein) whereby end faces 24 and 30 are induction hardened. Alternatively, for example, long section 77 may be made of 1018 or 1026 steel and surface hardened by nitriding or ferritic nitrocarburizing as described previously herein where the intermediate portion is then machined from the hardened material (as previously described above). Other techniques and materials may be used to construct the embodiment as shown in FIGS. 6A-6C other than those described herein.

Although the invention has been described with reference to the embodiments depicted herein, it is apparent to one skilled in the art that various modifications may be made without departing in any way from the spirit of the invention. For example, various other adjustable spacer configurations may be used. Any such modifications or configurations are intended to be within the scope of the invention as defined in the following claims.

The invention claimed is:

1. A method of manufacturing an adjustable spacer comprising:
    forming an annular shaped adjustable spacer comprising a first end portion, a second end portion and an intermediate portion therebetween; and
    forming the first end portion and the second end portion of the annular shaped spacer of a hardened material, wherein said first end portion and said second end portion are harder than the intermediate portion and wherein the intermediate portion is more deformable than the first end portion to allow the intermediate portion to compress in an axial direction.

2. The method of claim 1 wherein said annular spacer is configured to be assembled on an axle or spindle between two roller bearings to apply a force axially on said two roller bearings.

3. The method of claim 1 wherein the first end portion comprises a face exposed in the axial direction, the face being formed of said hardened material.

4. The method of claim 3 wherein the second end portion comprises a face exposed in the axial direction, the face being formed of said hardened material.

5. The method of claim 4 wherein said annular spacer is formed from a first starting material and wherein at least one of the first end portion and second end portion are hardened.

6. The method of claim 4 wherein said first end portion and second end portion are hardened without hardening the intermediate portion of said annular spacer.

7. The method of claim 4 wherein the intermediate portion is formed from a material different from said first end portion and second end portion.

8. The method of claim 4 wherein the intermediate portion is formed of separate sections, each of said separate sections having a different inner diameter.

9. The method of claim 8 wherein the separate sections comprise a long section and a short section wherein the short section fits over the long section.

10. The method of claim 7 wherein the intermediate portion is connected to said first end portion and second end portion by a weld or one or more pins.

11. A method of manufacturing an adjustable spacer comprising:
    forming an annular shaped adjustable spacer comprising a first end portion, a second end portion and a deformable intermediate portion therebetween; and
    forming the first end portion and the second end portion of the annular shaped spacer of a hardened material, wherein said first end portion and said second end portion are harder than the intermediate portion and wherein the deformable intermediate portion allows the intermediate portion to compress in the axial direction.

12. The method of claim 11 wherein said annular spacer is configured to be assembled on said axle or spindle between two roller bearings to apply a force axially on said two roller bearings.

13. The method of claim 11 wherein the first end portion comprises a face exposed in the axial direction, the face being formed of said hardened material.

14. The method of claim 13 wherein the second end portion comprises a face exposed in an axial direction, the face being formed of said hardened material.

15. The method of claim 14 wherein said annular spacer is formed from a first starting material and wherein at least one of the first end portion and second end portion are hardened.

16. The method of claim 14 wherein said first end portion and second end portion are hardened without hardening the intermediate portion of said annular spacer.

17. The method of claim 14 wherein the intermediate portion is formed from a material different from said first end portion and second end portion.

18. The method of claim 17 wherein the intermediate portion is connected to said first end portion and second end portion by a weld or one or more pins.

19. The method of claim 14 wherein the intermediate portion is formed of separate sections, each of said separate sections having a different inner diameter.

20. The method of claim 13 wherein the separate sections comprise a long section and a short section wherein the short section fits over the long section.

* * * * *